United States Patent [19]

Gould

[11] 4,449,112
[45] May 15, 1984

[54] OIL PRESSURE SENDER WITH ROLLING DIAPHRAGM

[75] Inventor: Richard E. Gould, Shelby, N.C.

[73] Assignee: Fasco Controls Corporation, Shelby, N.C.

[21] Appl. No.: 447,779

[22] Filed: Dec. 8, 1982

Related U.S. Application Data

[63] Continuation-in-part of Ser. No. 359,206, Mar. 18, 1982.

[51] Int. Cl.³ .............................................. H01L 10/10
[52] U.S. Cl. ........................................ 338/39; 338/42; 73/725; 73/115
[58] Field of Search ............... 338/39, 42, 36; 73/115, 73/715, 725, 746

[56] References Cited

U.S. PATENT DOCUMENTS

| 2,283,378 | 5/1933 | Liner | 73/725 X |
| 2,423,609 | 7/1947 | Middleton et al. | 73/725 X |
| 2,515,867 | 7/1950 | Fuller | 338/42 |
| 2,911,606 | 11/1959 | Hoffman | 338/42 |
| 3,069,645 | 12/1962 | Henke | 338/39 |
| 3,098,209 | 7/1963 | Stevens | 338/39 |
| 3,504,324 | 3/1970 | Creager | 338/42 |
| 4,279,162 | 7/1981 | Neill et al. | 338/39 X |

Primary Examiner—Roy N. Envall, Jr.
Assistant Examiner—Christopher N. Sears
Attorney, Agent, or Firm—Shlesinger, Fitzsimmons & Shlesinger

[57] ABSTRACT

This pressure sender or transducer comprises a metal housing having a steel cover and containing a rolling diaphragm which is secured over a cavity in the housing to communicate at one side with fluid under pressure, such as the oil in the crankcase of an automobile. Mounted centrally in the opposite side of the diaphragm is a rigid cup, which rotatably supports one end of a reciprocable plunger which in one embodiment carries two sets of equi-angularly spaced, resilient metal wipers or contacts, four of which are slidably engaged with the cylindrical operating surface of a printed resistor, which is mounted in the closed end of the cover, and four others of which are slidably engaged with the inner peripheral surface of the cover itself. The resistor comprises a steel can having a thin layer of porcelain baked on its outer peripheral surface, and a thin, cylindrical layer of resistance material printed and baked onto the porcelain layer with one end in electrical contact with the steel can. A coiled compression spring resists movement of the plunger in one direction, but cannot apply any rotational torque to the diaphragm because the plunger is mounted for rotation relative to the diaphragm. In a second embodiment the resistor and a ground conductor are printed on the plane surface of a ceramic substrate, and are engaged slidably by two sets of fine wires carried by the plunger.

28 Claims, 8 Drawing Figures

OIL PRESSURE SENDER WITH ROLLING DIAPHRAGMRELATED APPLICATIONS

This is a continuation-in-part of my copending application U.S. Pat. Ser. No. 06/359,206, filed Mar. 18, 1982.

BACKGROUND OF THE INVENTION

This invention relates to fluid pressure indicators or senders, and more particularly to an improved transducer-type of sender which employs a rheostat for providing an electrical indication of changes in fluid pressures. Even more particularly, this invention relates to an indicator of the type which employs a rolling diaphragm for transmitting changes in the oil pressure of an automotive vehicle or the like to an associated rheostat.

There are several known devices for converting changes in fluid pressure to an electric signal which is representative of the fluid pressure at any given instant. Typically such a device may be used in an automobile to sense oil pressure changes and to send a corresponding electrical signal to a gage or warning device on the dashboard of the vehicle. Many such prior devices used a flat diaphragm to transmit fluid pressure to a reciprocable plunger, or the like, which operated a variable resistance or rheostat in an associated indicator circuit. The problem encountered with the use of a flat diaphragm is that only a very slight motion can be imparted to the associated plunger, so that it has been necessary to employ an additional leverage or cam mechanism to multiply the slight motion of the diaphragm. These multiplying devices, however, require the use of a much larger housing to enclose all of the moving parts.

To obviate this disadvantage a so-called rolling diaphragm has been employed in certain such senders, as suggested for example by U.S. Pat. Nos. 3,069,645, 3,098,209 and 3,504,324. While these pressure senders or transducers employ either annular or planar type resistors in smaller housings, they have the disadvantage that the resistors are of the wire-wound varieties which have their terminations held in place on an associated insulating board by means of rivets, eyelets, or the like. The very small size of the resistance wire that is employed makes it extremely difficult to handle the wire during the winding and terminating operations. Also, in most cases there is no satisfactory means, operable from the exterior of the sender, to calibrate its spring tension.

Moreover, it has also been customary, as in the case of the above-noted U.S. patents, to employ a single electrical contact or wiper, which is shifted relative to the associated resistance coil or rheostat in response to pressure changes in the fluid which is used to operate the device. A single wiper or contact of this type, however, has required extremely high contact pressure to insure that the wiper will be maintained in contact with the associated resistor or rheostat at all times during the operation of the device. This high contact pressure causes rapid wear and short life expectancy for the device.

Still another disadvantage is that rolling diaphragms of the type disclosed in the above-noted patents cannot withstand the torque which is applied to the diaphragm by the associated compression spring during use. Such springs, as they are compressed, have a tendency to unwind and to impart a twisting motion or torque to the associated rolling diaphragm, thereby considerably shortening the life of the diaphragm. In many instances where diaphragms are made from rubber, they frequently tear and develop holes adjacent their marginal edges, thus resulting in an undesirable leakage of fluid through the diaphragm.

It is an object of this invention, therefore, to provide an improved pressure sender or transducer of the type described which is substantially more compact, inexpensive to manufacture, and longer-lasting than prior such devices.

A more specific object of this invention is to provide an improved pressure sender or transducer which utilizes a "printed" resistor of either the plane or cylindrical variety, thereby eliminating the need to employ conventional wound wire resistors or rheostats of the type heretofore employed in such devices.

Still another object of this invention is to provide an improved pressure sender of the type described which utilizes a rolling diaphragm that is connected to an associated indicator circuit by means which substantially eliminates any undesirable twisting of the diaphragm during use.

It is an object of this invention also to provide for an adjustable resistor and improved sliding contact or wiper, which comprises a plurality of inner-connected legs or blades that are slidably engaged with the associated resistor, and which therefore require substantially less contact pressure per blade than prior such wipers.

Other objects of the invention will be apparent hereinafter from the specification and from the recital of the appended claims, particularly when read in conjunction with the accompanying drawings.

SUMMARY OF THE INVENTION

The device comprises a housing having a rolling diaphragm connected across an oil cavity that is formed in the housing to communicate at one side with the engine block of an automobile or the like so that the oil in the engine will enter the cavity and apply pressure to one side of the diaphragm. The opposite side of the diaphragm engages the bottom of a swivel cup which rotatably supports one end of a reciprocable piston or plunger mechanism that is movable by the diaphragm against the resistance of a coiled compression spring. A ball point or pivot, which is interposed between the swivel cup and the adjacent end of the plunger, enables the plunger to rotate relative to the swivel cup, thereby to prevent any torque from being transmitted from the compression spring to the rolling diaphragm.

In one emobediment the plunger carries two sets of electrical contacts or wipers, the first of which is slidably engaged with a surrounding, metal cover, and the second plurality of which has sliding engagement with a stationary cylindrical, "printed" resistor, which is baked onto a porcelain-coated steel can, the upper end of which is connected to a metal terminal that extends exteriorly of the housing cover. As the plunger reciprocates the second set of wipers slide axially of the resistor either to increase or decrease the amount of resistance connected in the associated indicator circuit.

In a second emobodiment the plunger also carries two sets of electrical wipers or contacts which have sliding engagement with an axially adjustable plate having printed thereon a resistor engaged by one set of the contacts and a grounded conductor engaged by the other set. The plate can be adjusted by rotation of a calibrating screw mounted in the head of the metal cover.

DETAILED DESCRIPTION OF THE PREFERRED EMBODIMENTS

Referring now to the drawings by numerals of reference, and first to FIGS. 1 to 3, 10 denotes generally an axially bored metal housing having at one end (the lower end in FIG. 2) a reduced-diameter, externally threaded shank portion 12, and at its opposite end an enlarged head section 13, which has intersecting, hexigonally-shaped wrenching surfaces 14 formed on its outer peripheral surface. The bore in the housing shank 12 contains a conventional baffle 15, and opens at its inner end on an enlarged-diameter circular cavity or counterbore 16 formed in the head section 13 coaxially thereof. The upper or outer end of the cavity 16 is sealed by the movable center section of a flexible, rolling diaphragm 18.

Figure 1:
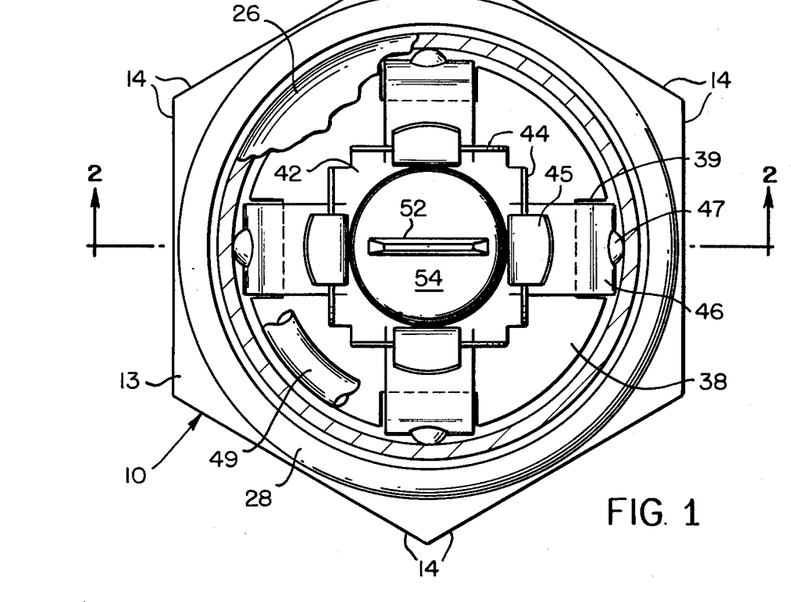
FIG. 1 is a plan view of a transducer or oil pressure sender made according to one embodiment of this invention, portions of its cover being cut away for purposes of illustration.
Figure 2:
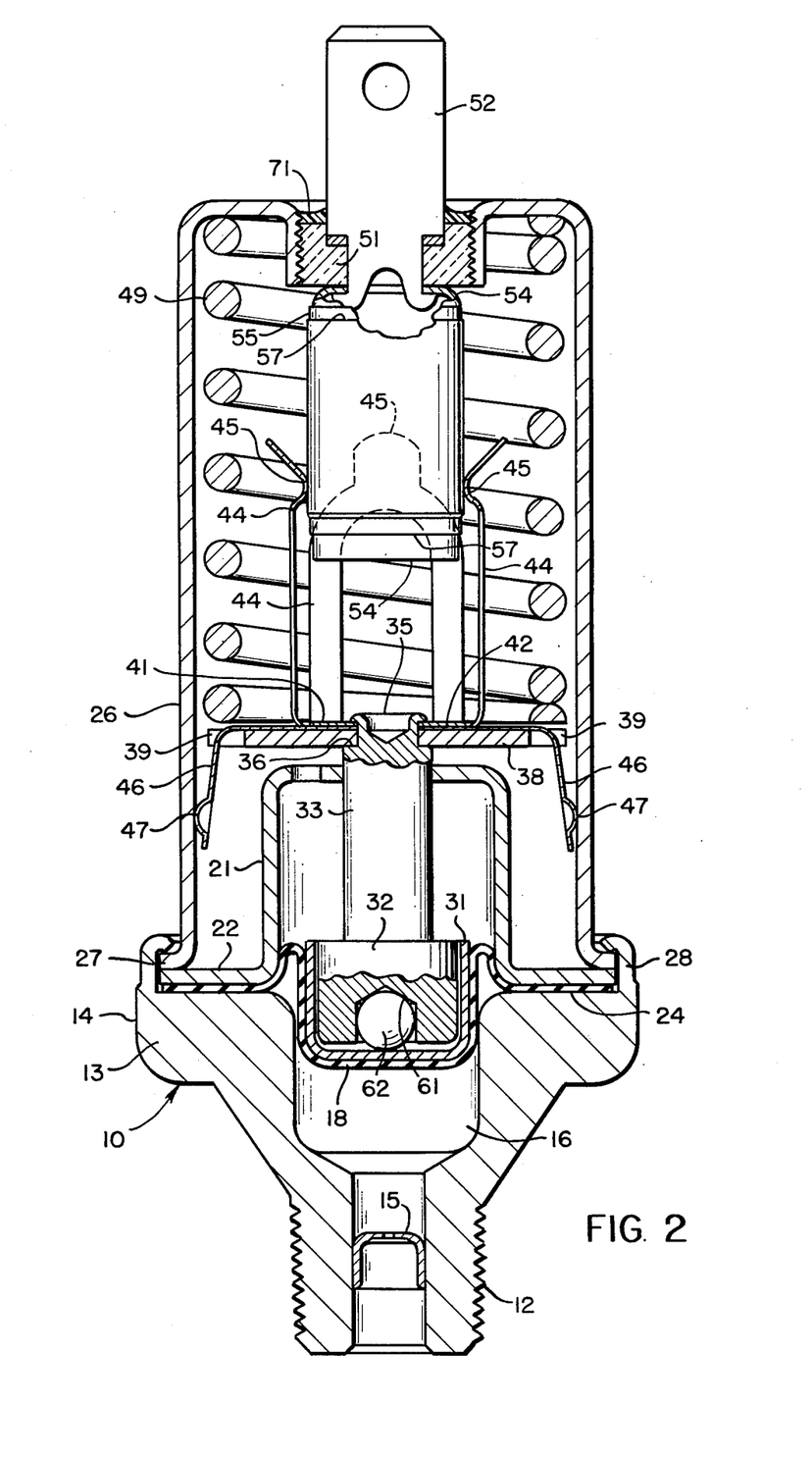
FIG. 2 is a sectional view of the sender taken generally along the line 2—2 in FIG. 1 looking in the direction of the arrows, but with portions shown in full.

Diaphragm 18 is held over the cavity 16 by an inverted cylinder cup 21, the lower, open end of which is surrounded by a radially projecting, circumferential flange 22. Flange 22 engages and secures the marginal, circumferential edge portion of diaphragm 18 against a plane surface 24 that is formed on the upper end of housing 10. The upper, closed end of cup 21 projects coaxially and in radially spaced relation into the lower end of an elongate, inverted, generally bell-shaped cover 26, the lower end of which has an outwardly rolled edge 27 that engages the cup flange 22 adjacent its outer periphery. Flange 22 and the rolled edge of cover 26 are surrounded by an annular flange 28, which projects coaxially from the upper end of housing 10 beyond its plane surface 24, and which has its upper or outer edge coined over the rolled edge 27 of cover 26 thereby sealingly to secure the lower end of cover 26 against flange 11, and in turn forcibly to secure flange 22 against the marginal edge of the diaphragm 18.

As shown more clearly in FIG. 2, the center, movable section of diaphragm 18 is generally cup-shaped in configuration, and surrounds a swivel cup 31, which is disposed to be moved by the center section of the diaphragm coaxially of cavity 16. Projecting slidably and rotatably into the upper end of cup 31 coaxially thereof is the cylindrically shaped head 32 of a plunger 33, which projects upwardly and slidably through a circular opening 34 formed in the upper, closed end of cup 21. Secured coaxially on the upper, reduced-diameter end 35 of plunger 33, and seated against a transverse circumferential shoulder 36 that is formed on the plunger above cylinder cup 21, is a circular retainer plate 38, which has in its periphery a plurality (four in the embodiment illustrated) of radial notches or grooves 39 for a purpose noted hereinafter.

Also secured to the upper end 35 of piston 33 beneath a metal washer 41, and against the retainer plate 39, is the center section or hub of a metal wiper plate or contact plate 42. Integral with and projecting vertically upwardly from the edges of plate 42 at 90° intervals thereabout are four, resilient wiper legs 44, each of which has a curved electrical contact 45 formed on its upper end. Struck from the center of each leg 44, or otherwise made integral at one end with the contact plate 42 at 90° intervals thereabout, are four additional wiper legs 46. Each leg 46 is bent intermediate its ends downwardly to extend through one of the notches 39 in the retainer plate 38, and has on its lower end a curved grounding contact 47 that has sliding engagement with the inner peripheral surface of the steel cover 26.

As shown more clearly in FIG. 2, the upstanding wiper legs 44 are surrounded in radially spaced relation by one end of a coiled compression spring 49, the lower end of which is seated against the retainer plate 38, and the upper end of which is seated against the closed end of cover 26. As will be obvious from an examination of FIG. 2, the spring 49 tends normally to urge plunger 33 and the attached wiper legs 44 downwardly or in the direction of the diaphragm 18, and resiliently resists any upward movement which might be imparted by the diaphragm during use of the device.

Threaded coaxially into a central opening formed in the upper end of cover 26 is a generally disc-shaped dielectric insulator 51. Secured intermediate its ends in the center of this insulator and projecting exteriorly of the cover 26 is a conventional terminal or blade 52. Secured to the inner end of terminal 52 beneath the insulator 51, and projecting coaxially downwardly into the center of cover 26 and between the upper ends of the four wiper legs 44, is a steel can 54. As shown in FIG. 2, the upper end of the can 54 can be fastened to the inner end of the terminal 52 by staking or otherwise coining portions of the inner end of the terminal against the inside of the can, thereby fixing the can to the underside of insulator 51, and providing secure electrical contact between the can and terminal 52.

Figure 3:
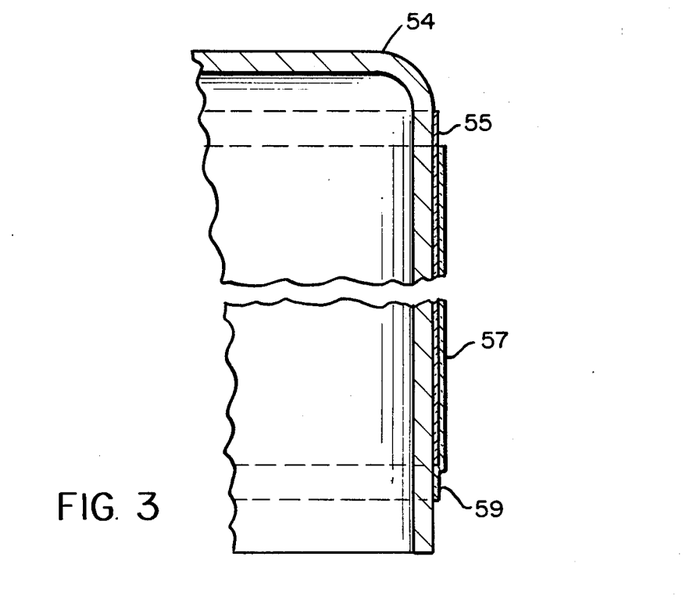
FIG. 3 is a fragmentary sectional view illustrating part of the sender as shown in FIG. 2, but greatly enlarged for purposes of illustration.

Intermediate its ends the steel can 54 has secured to its outer peripheral surface a thin layer 55 of porcelain, which in practice may be applied in fluid form to the outside of the can, and then may be baked onto the can. Moreover, as shown in FIGS. 2 and 3, this porcelain layer 55 does not cover the entire outer surface of the can 54, but instead terminates at points axially spaced inwardly from opposite ends of the can. Applied as by "printing" to the outer surface of layer 55 is a thin, metallic resistor 57. As shown more clearly in FIG. 3, the upper edge of resistor 57 terminates beneath the upper edge of porcelain layer 55, but the lower edge of the resistor extends downwardly and below the lower edge of porcelain layer 55, and into electrical contact with the steel can 54, as shown for example at 59 in FIG. 3. After the resistor has been applied to the porcelain layer 55 it can be baked to fix it in place around the insulating layer 55 of porcelain, and in electrical contact with the can 54 in the area denoted as 59 (FIG. 3).

Mounted in a central recess 61 in the bottom of the plunger base 32, and projecting downwardly and slidably out of this recess to engage the bottom of the swivel cup 31 is a steel ball or sphere 62, which causes the plunger base 32 to be held slightly above and in spaced relation to the bottom of cup 31. As noted hereinafter, this permits the plunger 33 to be rotated relative to cup 31 when the device is in use.

In use, and assuming that the device is to be used for monitoring the pressure of the lubricating oil in an automotive engine, the shank 12 of housing 10 is threaded into the engine block so that its bore communicates with the oil in the engine. The oil flows into the cavity 16 and into engagement with the movable center section of diaphragm 18, so that variations in the pressure of the oil will cause the center section of the diaphragm to reciprocate coaxially of chamber 16: upwardly in FIG. 2 as the oil pressure increases, and downwardly as the pressure decreases. This movement of the diaphragm is imparted by the plunger 33 to the wiper legs 44, the contact portions 45 of which are in sliding engagement with the outer peripheral surface of the resistor 57.

At this time, assuming that the terminal 52 is connected into an electrical circuit for indicating the oil pressure of the vehicle, the circuit would be completed to ground from terminal 52, through the steel can 54, the resistor 57 the contacts 45 of the wiper legs 44, the contact plate 42, its other legs 46 to the grounding contacts 47, and finally to the steel cover 26, which is grounded on the engine block. As a result of these connections, whenever the sliding contacts 45 rise upwardly on the resistor 57 it will cause more resistance to be introduced into the circuit; and conversely, whenever the wipers 45 slide downwardly toward the lower edge of resistor 57, they will tend to remove a corresponding amount of resistance from the associated circuit. These variations in the resistance of the circuit are calibrated to reflect corresponding variations in the oil pressure in the engine block in a manner which will be apparent to one skilled in the art.

As the piston 33 reciprocates in response to changes in oil pressure the compression spring 49 is subjected to corresponding contraction and expansion. Spring 49 will tend to unwind when it is being compressed, and in so doing it will likewise tend to rotate the retainer plate 38, and hence the attached plunger 33 about the axis of the housing. In prior, known devices, this twisting torque normally was applied also to the flexible diaphragm 18, which as a result tended eventually to tear or develop holes, thus destroying the effect of the device. With applicant's invention, however, this undesirable twisting of the diaphragm 18 is eliminated, because the ball 62 permits the plunger 33 and its base 32 to rotate relative to the can 31, so that without interferring with the proper operation of this device, the undesirable twisting of the diaphragm is eliminated.

Still another feature of this invention is the use of the printed resistor, which eliminates the need for winding or otherwise manipulating wires to form a conventional variable resistor or rheostat. The electrical connection between the steel can 54 and the resistor 57 is made permanently and accurately at the time that the resistor is applied and baked onto the porcelain layer 55. There are, therefore, no wires or rivets to be manipulated during assembly, and which might become loose during operation of the device and cause an interruption in the circuit. Moreover, by employing the cylindrically shaped, printed resistor, it is possible to use a plurality of wiper contacts 45 for connecting the resistor in the circuit. The advantage of this construction is that it permits lower spring pressure to be employed on the contacts 45, as compared to prior such devices wherein when only a single wiper contact was employed, a relatively high contact pressure had to be applied in order to assure proper operation of the circuit. By employing four separate wiper contacts 45 it is possible to reduce the spring pressure applied by the wiper legs 44 to the contacts, thereby minmizing the wear that might otherwise result from sliding movement of the contacts 45 relative to resistor 57. Moreover, even if for some reason no readily apparent one or more of the sliding contacts 45 were to become disengaged from the resistor, any one of the remaining four contacts, if engaged with the resistor 57, could maintain the necessary continuity in the associated circuit.

Also, by striking or punching all eight of the wiper legs (the four upright legs 44, and the four downwardly bent legs (46) out of the same wiper plate 42, it is possible considerably to reduce the amount of assembly operations and mechanical connections that are required to connect the resistor 57 adjustably in the associated circuit. Still another feature of the invention is employing the externally threaded insulator 51 for mounting the can 54 in the upper end of the cover 26. After assembly the device can be calibrated by adjusting insulator 51, and hence resistor 57. After calibration, the insulator 51 can be secured against further rotation, and the cover 26 can be sealed, by applying the epoxy seal 71 (FIG. 2) to the upper surface of the insulator 51 around terminal 52 and the threaded junction of the insulator with cover 26.

While in this embodiment of the invention ball 62 has been shown to be separate from base 32, it obviously could be integral with the base, which would then have a segmental spherical projection on its lower end; or alternatively, the projection could be a point formed on the bottom, inside surface of the cup 31, in which case the piston base 32 could then have a plane bottom surface. Moreover, while it has been suggested that the grounding legs 46 be struck from the centers of the four upright wiper legs 44, obviously the various legs could be made, if desired, from two separate wiper plates 42 positioned one on the other, or they could be made from the same plate in such a manner that they would project from the edge of the plate at different, spaced angular positions thereabout.

Referring now to the embodiment shown in FIGS. 4 to 8, 70 denotes generally a modified fluid pressure sender comprising a housing 10, which is similar to that shown in the first embodiment. The housing has its cavity 16 covered by a modified, flexible, rolling diaphragm 71, which has formed thereon adjacent its outer edge a circular ring bead 72. Bead 72 projects into an annular recess 73 formed in the underside of a retainer element 74, which has an outer, circumferential flange portion 75 secured coaxially against the upper housing surface 24 beneath the rolled lower edge 77 of a generally bell-shaped, metal cover 76. As in the first embodiment the upper, outer edge of housing 10 is coined over the lower, rolled edge 77 of the cover 76, thereby sealingly to secure the lower end of the cover against the retainer flange 75, and in turn causing the ring bead 72 on diaphragm 71 to be compressed snugly into the recess 73 in the bottom of retainer 74.

It is to be noted that, while the lower edge of the flange 75 on the retainer element 74 is directly engaged with the plane surface 24 on housing 10, the annular boss 78 on the underside of element 74, which forms the radially inner side of the recess 73, is spaced slightly from the housing surface 24. This leaves enough room for the diaphragm 71 to pass between the boss 78 and surface 24, and yet prevents the ring bead 72 from being dislodged from recess 73, when the sender is in use.

Secured in the bore of housing 10 and engaging the underside of the diaphragm 71 centrally thereof is a conventional roll pin, which permits the passage of fluid under pressure from a source to the housing cavity 16. Seated at its closed, lower end on the upper side of diaphragm 71 is a swivel cup 81, the upper end of which projects slidably through a bore in the upper end of 82 of the retainer element 74.

Slidably mounted in the bore of cup 81 coaxially thereof is the reduced-diameter lower end of a combination bearing and spring retaining cup 84. Cup 84 has intermediate its ends a radially outwardly projecting, transverse portion 85, which overlies the upper end of the swivel cup 81, and an upper, enlarged-diameter retainer section 86, which is axially reciprocable in cover 76 in closely spaced relation to its inner peripheral surface. Axial movement of cup 84 is resisted by a coiled compression spring 89, which is generally similar to that employed in the first embodiment, and which is seated at its upper end against the top of cover 76, and at its lower end on a retaining ring 88 that is seated against the transverse section 85 of cup 84.

Adjustably threaded into an internally-threaded bore 91 formed in the upper end of the cover 76 is a hollow calibrating screw 92, the lower end of which projects downwardly and coaxially into the center of the coiled compression spring 89. Secured intermediate its ends in a cap 93, which is fixed in the upper end of the screw 92, is a metal terminal 94, one end of which projects upwardly (FIG. 4) to the exterior of the sender 70, and the other end of which projects downwardly into the bore in screw 92. Terminal 94 has in its lower end a rectangular notch 96, which registers with the upper end of a ceramic plate 98, that has opposite side edges thereof secured in registering grooves 99 (FIG. 5) formed in the calibrating screw 92 at opposite sides of its bore.

Figure 4:
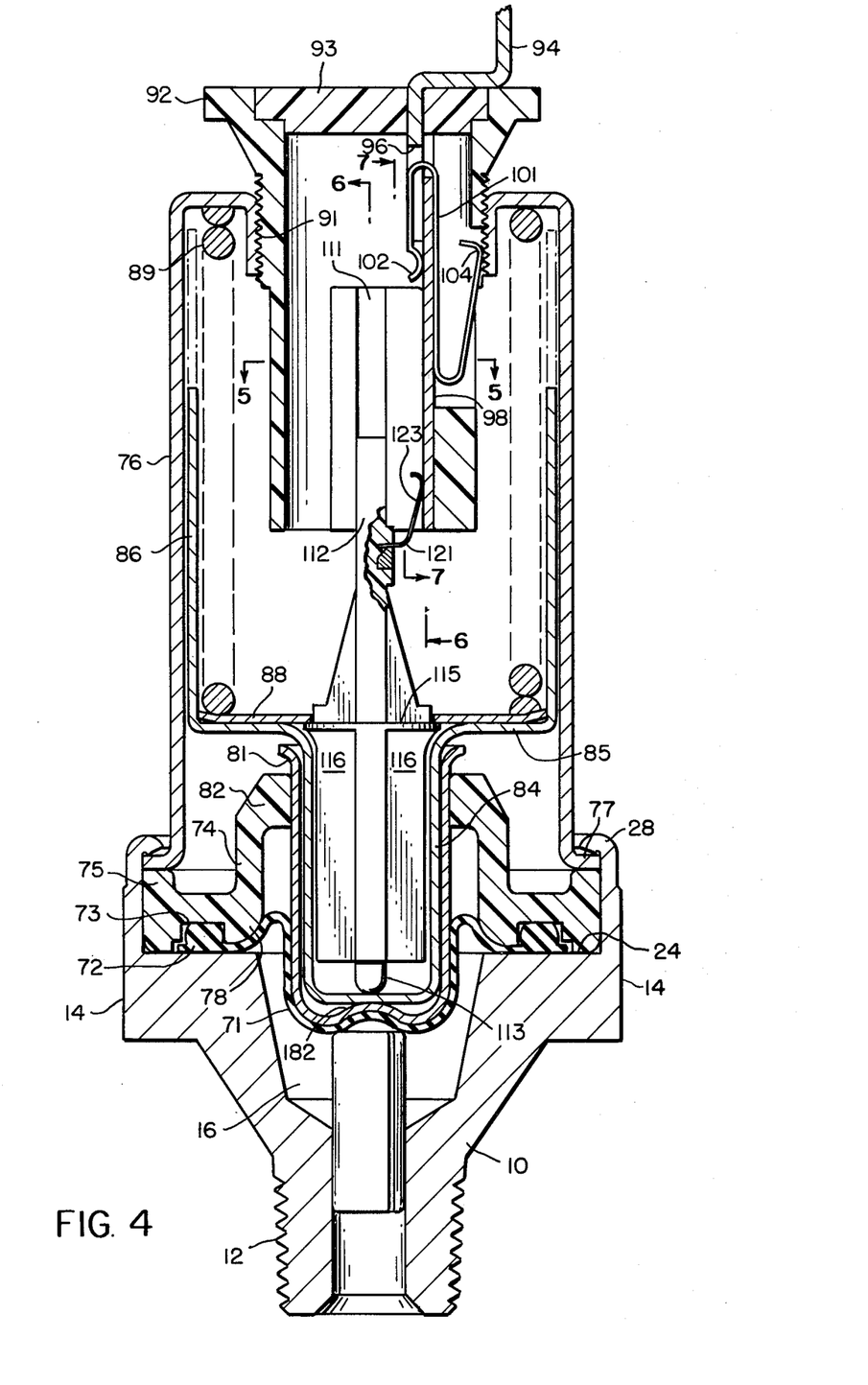
FIG. 4 is a sectional view similar to FIG. 2 but showing a modified form of this sender.

A metal grounding wire or conductor 101 is secured intermediate its ends to the back side of plate 98, and has one end bent to extend over the top of plate 98, through the notch 96 in terminal 94, and downwardly over the face of plate 98 (the left side thereof as shown in FIG. 4), where a curved end portion 102 of the conductor is secured by a solder pad 103 (FIG. 7) to the upper end of a strip conductor 109 that is printed on the face of plate 98. At its opposite end the ground conductor 101 is bent to form thereon a resilient contact portion 104, which is slidably engaged with the threaded surface 91 on cover 76, whereby when the housing 10 is secured to a metal engine block or the like, the strip conductor 109 on plate 98 will be grounded through the solder pad 103, the ground wire 101, the metal cover 76 and the housing 10 to the engine block.

Figures 5, 7:
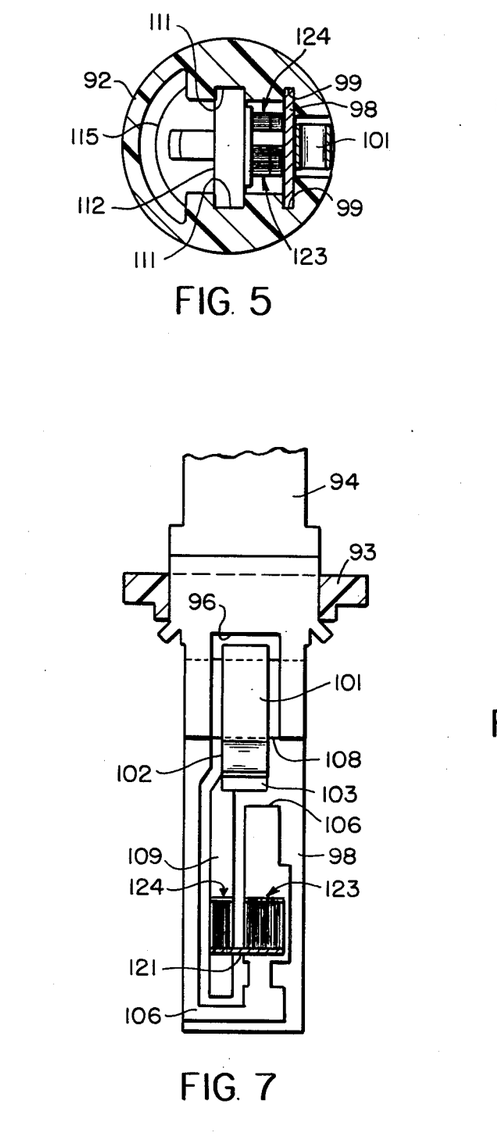
FIGS. 5-7 are sectional views taken along the lines 5—5, 6—6 and 7—7, respectively, in FIG. 4 looking in the direction of the arrows.
Figure 6:
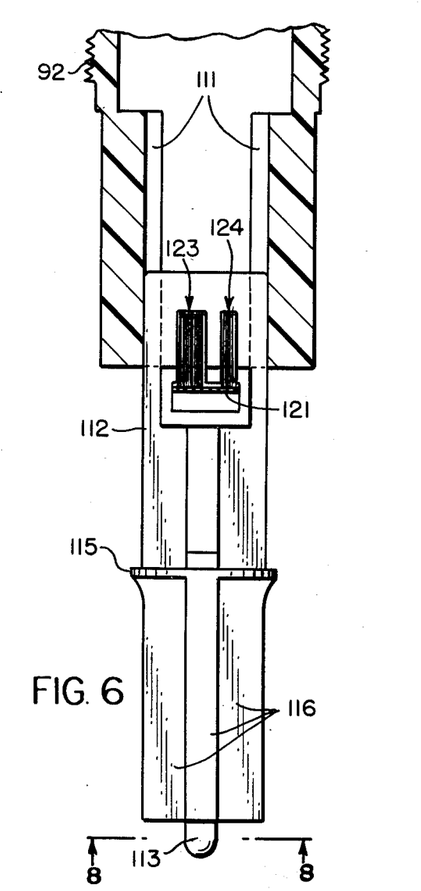
Figure 8:
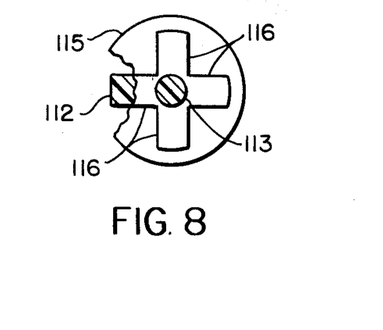
FIG. 8 is a sectional view taken along the line 8—8 in FIG. 6 looking in the direction of the arrows.

The plate 98, which preferably is an alumina ceramic element, also has printed and baked on its face beneath the solder pad 103, and adjacent the strip conductor 109, a laser-trimmed, variable resistor element denoted generally by numeral 105 in FIG. 7. The upper end of the resistor 105 is spaced slightly beneath the solder pad 103, and its lower end is connected to one leg of a generally L-shaped conductor 106, which is also printed on the face of plate 98 adjacent the ground conductor 109, and which has its upper end connected by a solderpad 108 with the terminal 94.

Slidably guided at opposite sides thereof in opposed ways or grooves 111 formed in the bore wall of the calibrating screw 92 is a generally rectangularly shaped plunger 112, which is disposed to reciprocate in confronting relation to the ceramic plate 98. This plunger projects coaxially downwardly through the bore in the retaining ring 88 into the bearing cup 84, and has formed on its lower end a segmental-spherical boss or projection 113, which is seated on the plane bottom surface of cup 84. Intermediate its ends plunger 112 has formed thereon an enlarged-diameter, circumferential flange 115, which projects rotatably beneath the marginal edges of the central opening in the retaining ring 88, which thus functions to prevent axial movement of the plunger 112 relative to cup 84, but which also permits rotation of the plunger 12 relative to cup 84 for calibration purposes, as noted hereinafter. Also, plunger 112 has a width slightly less than the inside diameter of cup 84, and has projecting from opposite sides thereof within the cup a pair of ribs 116, which serve to help retain the plunger in coaxial alignment with the cup 84.

Secured in a transverse recess formed in the side of the plunger 112 which faces plate 98 is a metal bar or conductor 121. Intergral with or otherwise secured at their lower ends to the outer edge of conductor 121 are two, spaced pluralities of fine, wire conductors or wiper elements denoted generally by the numerals 123 and 124, respectively. The upper, outer ends of the fine wires in each of the two groups 123 and 124 are disposed to have sliding, electrical contact with the resistor 105 and the conductor 109, respectively. When the plunger 112 reciprocates in the sender 70 in response to changes in the fluid pressure in the housing cavity 16, the brush wires 123 will slide vertically (as shown in FIG. 4) on the face of the resistor 105 at the same time that the other brush wires 124 slide on ground conductor 109, thereby completing a circuit, for example, from the terminal 94 through the solder pad 108, the conductor 106, the resistor 105, the brush wires 123, the conductor 121, the brush wires 124, the conductor 109, the solder pad 103 and the ground wire 101 and housing 10 to ground. Obviously as the brush wires vertically on the resistor 105 the amount of current flow in the circuit will vary, thus providing means for indicating the variations in the fluid pressure in cavity 16.

One of the principal advantages of this second embodiment of the invention is that with the use of a plane, flat, strip-type resistor 105, it is possible to reduce the overall diameter of the sender, and to use longer and narrower printed resistors, which in many cases are preferable to the cylindrically-shaped resistors. This configuration also permits reduction in the overall size of the contacts which have sliding engagement with the resistor, thus permitting the use of extremely tiny, closely spaced wires to form each of the two bush elements 123, 124. In this manner it is possible also to permit laser trimming of the printed resistor, thus substantially reducing the overall size of the sliding contacts engaged both with the resistor and with the printed ground wire 109.

Still another advantage of this invention is that the use of the ring bead adjacent the periphery of the flexible diaphragm eliminates the need for squeezing or pinching the diaphragm itself, when the housing flange 28 is coined over the cover flange 77. This coining process applies extreme axial pressure to the retainer 74, but because of the presence of the bead ring 72, this pressure is applied only to the thickened portion of the diaphragm as defined by the bead 72, and thereby prevents any weakening or puncturing of the diaphragm itself.

A further advantage of this construction is that by use of the annular boss 82 on the retainer element 74, together with the elongate cup 81 which surrounds the reduced-diameter end of the cup 84, substantially absolute concenticity is maintained between the diaphragm, the plunger 112 and the cover 76. In this respect also the upper end of the cup 84 provides means for slidably retaining the compression spring 89 to prevent the spring from applying any undesirable side loading to the cup 81 and diaphragm 71. As in the first embodiment, however, any torsion which the spring 89 might tend to apply to the diaphragm 71 will be dissipated by relative rotation between the cup 84 and the spherically-shaped end 113 of the plunger 112. Moreover, a dimple 182 which is struck up from the bottom of cup 81 engages the plane bottom of cup 84 thereby also preventing any undesirable rotation from being transmitted through cup 84 to the diaphragm.

Since in this second embodiment the resistor and wiper elements engage each other on a plane surface, it is necessary for calibrating purposes to rotate both of these elements at the same time. Consequently, the resistor supporting plate 98 is fixed for rotation with the calibrating screw 92, while by virtue of the tongue and groove connections between the plunger 112 and the ways 111, the plunger 112 and its brushes 123, 124 are likewise caused to be rotated simultaneously with member 98, whenever the calibrating screw 92 is rotated relative to cover 76. It is for this purpose that the lower end of plunger 112 is rotatable in the cup 84, this relative rotation between the plunger and cup 84 being permitted by virtue of the retaining ring 88, which permits the flange 115 to be rotated relative to cup 84. Obviously, although they rotate together during calibration, it will be apparent that calibration will cause the brushes 123, 124 to be shifted axially relative to the resistor 105 on member 98, thus effecting the necessary calibration.

In practice the wiper brushes 123, 124 comprise a series of short wires, which are welded side-by-side to the cross bar or conductor 121. The assembly is then heat staked or otherwise secured in the face of the plunger 112. The wires thus provide a multitude of contact points, considerably reducing wear on the resistor 105, and eliminating undesirable electrical noise.

It is to be understood that in the case of either embodiment the resistor could, if desired, be mounted for reciprocation with the plunger, in which case the resilient contacts or brushes engaging the resistors would be adjustably fixed relative to the associated cover and housing. Moreover, it would be possible in the case of either embodiment to bake the resistor either on the ceramic substrate such as plate 98, or a porcelain insulation baked on a metal substrate as disclosed in connection with the first embodiment. Instead of a ceramic or porcelain substrate a different kind of dielectric could be employed if capable of standing the operating temperatures for which the sender is designed.

While this invention has been illustrated and described in detail in connection with only certain embodiments thereof, it will be apparent that it is capable of still further modification and that this application is intended to cover any such modifications as may fall within the scope of one skilled in the art, or the appended claims.

What I claim is:

1. A fluid pressure transducer, comprising
    a housing having a metal cover secured to one end thereof,
    a flexible diaphragm secured over a cavity in said housing to communicate at one side with a fluid under pressure,
    a variable resistor mounted in said cover and connected at one end to an electrical terminal on the exterior of said cover,
    a plunger mounted to reciprocate between said resistor and said opposite side of said diaphragm in response to changes in the pressure of said fluid, and having thereon two sets of resilient contacts slidably engaged with said resistor and with said cover, respectively,
    a coiled compression spring interposed between said cover and said plunger resiliently to resist movement of said plunger in one direction by said diaphragm, and
    means for preventing said spring from applying a rotational torque to said diaphragm.

2. A fluid pressure transducer as defined in claim 1, wherein said means comprises means mounting said plunger for rotation by said spring relative to said diaphragm.

3. A fluid pressure transducer as defined in claim 2, wherein,
    said diaphragm is a rolling diaphragm having a rigid, cup-shaped member mounted on its movable center section with the open end of said member facing said plunger, and
    said mounting means comprises means supporting one end of said plunger in said cup-shaped member for rotation relative thereto.

4. A fluid pressure transducer as defined in claim 1, wherein
    a metal substrate is secured in said cover and is electrically connected to said electrical terminal,
    a thin layer of dielectric material is secured to the surface of said substrate to cover a portion thereof, and
    said resistor is a thin layer of resistance material secured to the surface of said dielectric layer to cover a portion thereof, and having one end thereof secured in electrical contact with said metal substrate.

5. A fluid pressure transducer as defined in claim 4, wherein said layer of dielectric material is a layer of porcelain baked on said surface of the metal substrate, and said resistor is printed and baked on said layer of porcelain to secure it thereto.

6. A fluid pressure transducer as defined in claim 1, wherein each of said sets of contacts are struck from the same piece of metal.

7. A fluid pressure transducer as defined in claim 1, wherein
    a metal wiper plate is secured to said plunger for reciprocation therewith,
    said resistor has thereon a cylindrical operating surface, and
    the contacts of one of said sets are integral at one end with said wiper plate and project at their opposite ends from said plate at angularly spaced points thereabout, and slidably into contact with said operating surface on said resistor.

8. A fluid pressure transducer as defined in claim 7, wherein the contacts of the other of said two sets are struck from the contacts of said one set.

9. A fluid pressure sender, comprising
an enclosure disposed to be connected to ground,
a rolling diaphragm secured across a cavity in one end of the enclosure for communication at one side with a fluid under pressure,
a variable resistor mounted in said enclosure adjacent the opposite end thereof, and having thereon a cylindrical operating surface connected at one end to an electrical terminal on the exterior of said enclosure,
a plunger having thereon a plurality of angularly spaced, radially-projecting contacts, and
means mounting said plunger for reciprocation between said resistor and the opposite side of said diaphragm in response to changes in the pressure of said fluid, and with certain of said contacts held in sliding engagement with said operating surface of the resistor at angularly spaced points about its axis, and with certain others of said contacts held in sliding engagement with the inner surface of said enclosure.

10. A fluid pressure sender as defined in claim 9, including a metal wiper plate secured to said plunger coaxially of said operating surface of said resistor and having integral therewith said certain contacts which project radially from said plate at equi-angularly spaced points thereabout.

11. A fluid pressure sender as defined in claim 10, wherein said certain other contacts are integral with said wiper plate and project radially therefrom at said equiangularly spaced points thereabout.

12. A fluid pressure sender as defined in claim 10, wherein said resistor comprises a metal cylinder having a thin layer of baked porcelain secured on its outer peripheral surface, and a thin variable resistor coil printed and baked on said porcelain layer and in contact at one end with said metal cylinder.

13. A fluid pressure sender as defined in claim 10, wherein said mounting means includes
a coiled compression spring mounted in said enclosure to resist movement of said plunger in one direction, and
means interposed between said diaphragm and said plunger to allow rotation of the plunger relative to said diaphragm.

14. A fluid pressure sender, comprising
a housing having a cover projecting from one end thereof,
a flexible diaphragm,
means securing said diaphragm around its marginal edge over an opening in said housing to be placed in communication at one side thereof with a supply of fluid under pressure,
a plunger mounted to reciprocate in said cover in response to changes in the pressure of said fluid,
circuit means in said cover including a variable resistor element and a wiper element having sliding engagement with said resistor element,
means mounting one of said elements on said plunger for movement therewith relative to the other element in response to changes in said fluid pressure,
a coiled compression spring interposed between said cover and said plunger resiliently to urge said plunger toward the opposite side of said diaphragm, and
means for preventing said spring from applying a rotational torque to said diaphragm.

15. A fluid pressure sender as defined in claim 14, wherein
said diaphragm has an enlarged, circumferential bead formed thereon adjacent its outer peripheral surface, and
said securing means comprises a retainer ring secured between the confronting ends of said housing and said cover, and operatively squeezing said bead against a stationary surface formed on said housing around said opening.

16. A fluid pressure sender as defined in claim 14, wherein
said wiper element is mounted on said plunger and said resistor element is fixed in a predetermined position in said cover, and
a second wiper element is mounted on said plunger with one end connected to the first-named wiper element, and with the other end thereof having sliding engagement with a conductive surface in said cover.

17. A fluid pressure sender as defined in claim 14, wherein said resistor element is cylindrical in configuration and said conductive surface comprises the inner peripheral surface of said cover.

18. A fluid pressure sender as defined in claim 16, wherein said resistor element and said conductive surface are mounted in spaced relation to each other on a plane, flat surface located inside said cover.

19. A fluid pressure sender as defined in claim 16, wherein said means for preventing the application of rotational torque to said diaphragm comprises means mounting said plunger for rotation by said spring relative to said diaphragm.

20. A fluid pressure sender as defined in claim 14, wherein
said diaphragm is a rolling diaphragm having a rigid cup member mounted on its movable center section for reciprocation by the diaphragm, and
means is provided for supporting one end of said plunger in said cup member for rotation relative thereto by said spring, and for axial reciprocation with said cup member in response to changes in said fluid pressure.

21. A fluid pressure sender as defined in claim 20, wherein said supporting means comprises
a second cup member having a closed end seated rotatably in the first-named cup member, and an open end surrounding one end of said compression spring, and
means securing one end of said plunger coaxially in said second cup member for axial reciprocation therewith, and for rotation relative to said second cup member.

22. A fluid pressure sender as defined in claim 21, wherein said supporting means further comprises
a calibrating screw mounted in an opening in said cover for rotational adjustment from the exterior of the cover, and
means on said screw slidably engaged with said plunger to guide the plunger for reciprocation with said second cup member and for rotational movement by said screw.

23. A fluid pressure sender as defined in claim 22, wherein a substrate is secured to said screw in said cover and has thereon a plane surface disposed in spaced, confronting relation to said plunger, said resistor element is printed on said substrate to extend in the direction of reciprocation of said plunger, and said wiper element is secured at one end to said plunger and has sliding contact at its opposite end with said resistor.

24. A fluid pressure sender as defined in claim 23, wherein a ground conductor is printed on said plane surface on said substrate in spaced, adjacent relation to said resistor, and a second wiper element has one end secured on said plunger in electrical connection with the first-named wiper element and has the opposite end thereof disposed in sliding engagement with said ground conductor.

25. A fluid pressure sender as defined in claim 24, wherein said opposite end of each of said wipers comprises a plurality of fine, closely-spaced, resilient wires.

26. A fluid pressure sender, comprising an enclosure having a rolling diaphragm secured over an opening in one end thereof, and having a compression spring mounted in the opposite end thereof coaxially of said diaphragm.

reciprocable plunger means mounted in said enclosure between said diaphragm and said compression spring for movement by said diaphragm against the resistance of said spring in response to the application of fluid pressure through said opening and against said diaphragm, a calibrating screw mounted in a second opening in said enclosure for rotational adjustment from the exterior of the enclosure, a rigid substrate supported on said screw in said enclosure and having thereon a plane surface disposed in spaced, confronting relation to said plunger, a variable resistor secured on said surface to extend in the direction of reciprocation of said plunger means, and a plurality of resilient, electrical contacts secured to said plunger means for reciprocation therewith and to have sliding engagement with said resistor when said plunger means is reciprocated.

27. A fluid pressure sender as defined in claim 26, including means on said screw having sliding engagement with one end of said plunger means to guide the latter for reciprocation of said diaphragm and to transmit rotation of said screw to said plunger.

28. A fluid pressure sender as defined in claim 26, including means supporting the opposite end of said plunger means for rotation relative to said diaphragm thereby to prevent any rotational torque from being applied by said compression spring to said diaphragm.

* * * * *